United States Patent [19]

Cromack

[11] Patent Number: 5,163,050
[45] Date of Patent: Nov. 10, 1992

[54] CONFIGURABLE PARAMETER DTMF DETECTOR

[75] Inventor: Mark R. Cromack, Santa Ynez, Calif.

[73] Assignee: Digital Sound Corporation, Carpinteria, Calif.

[21] Appl. No.: 644,934

[22] Filed: Jan. 23, 1991

[51] Int. Cl.⁵ .................................................. H04J 3/12
[52] U.S. Cl. .................................... 370/110.3; 379/98; 379/339
[58] Field of Search ............... 370/60.1, 60, 17, 110.3, 370/110.1; 379/40, 105, 92, 339, 97

[56] References Cited

U.S. PATENT DOCUMENTS

| | | | |
|---|---|---|---|
| 4,748,654 | 5/1988 | Gray | 379/105 |
| 4,755,985 | 7/1988 | Jayapalan | 370/60 |
| 4,873,687 | 10/1989 | Breu | 371/8.2 |
| 4,996,703 | 2/1991 | Gray | 379/40 |
| 5,029,199 | 7/1991 | Jones et al. | 370/60.1 |

Primary Examiner—Douglas W. Olms
Assistant Examiner—T. Samuel
Attorney, Agent, or Firm—Christie, Parker & Hale

[57] ABSTRACT

In a digital messaging system (10), an apparatus (37) and method for determining whether a DTMF (Dual Tone Multi Frequency) digit is present on an input signal (11,12). A heuristics engine (37) performs a series of tests on the input signal (11,12) using a set of parameters that are stored in a RAM (38). There is one parameter for each of a set of input signal (11,12) characteristics and for each of a set of operating modes of the digital messaging system (10). All of the parameters are configurable. The configurability allows for the use of non-standard telephone equipment (13,14) and minimizes deleterious effects such as talkoff. The tests are from the set of sets comprising an absolute magnitude test, a frequency deviation test, a twist test, an echo test, a consistency test, and a temporal test.

19 Claims, 5 Drawing Sheets

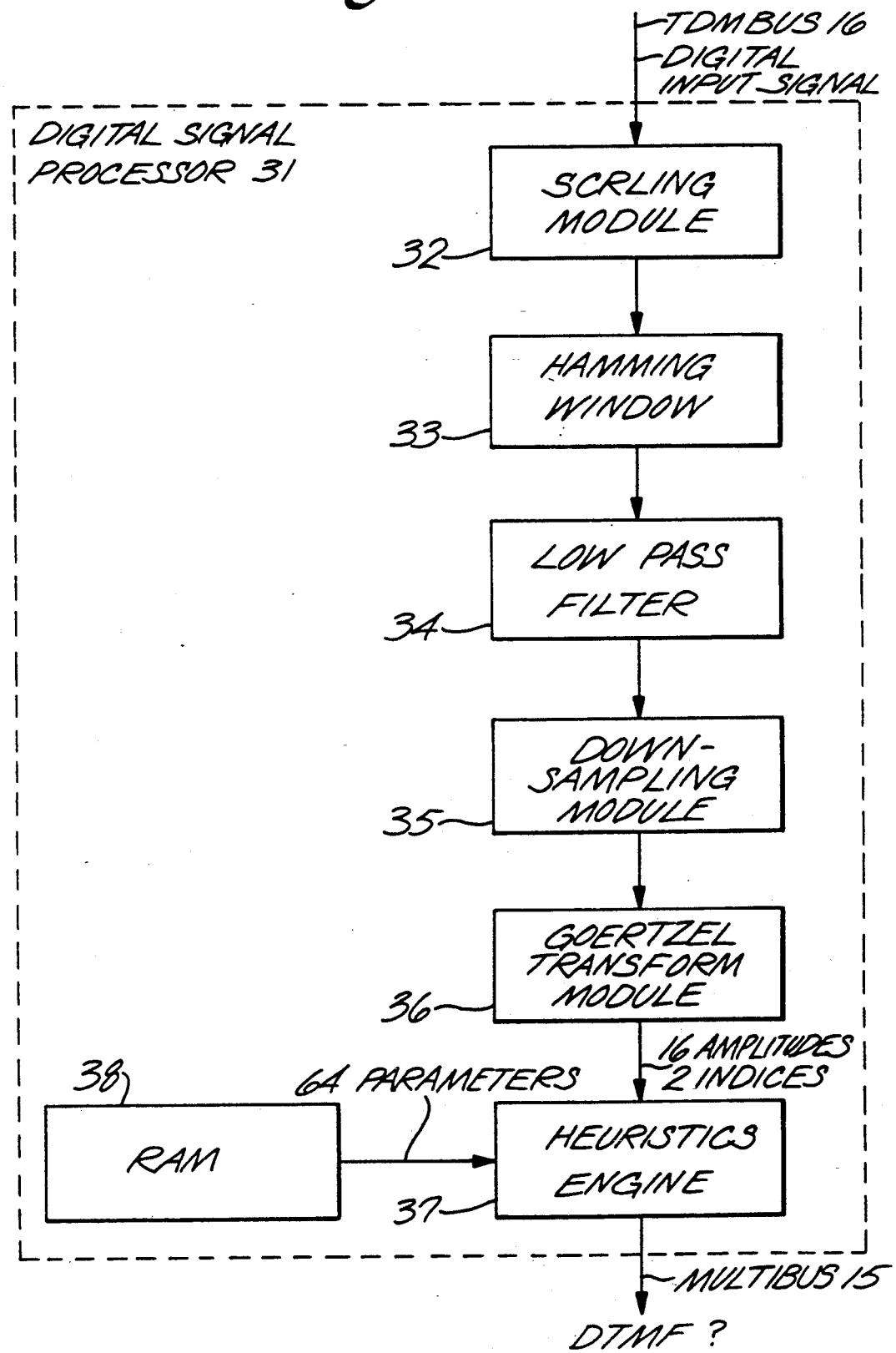

BEFORE HAMMING WINDOW 33

AFTER HAMMING WINDOW 33

CONFIGURABLE PARAMETER DTMF DETECTOR

DESCRIPTION

1. Technical Field

This invention pertains to the field of digital messaging systems employing DTMF (Dual Tone Multi Frequency) signaling.

2. Background Art

A prior art search was conducted through the records of the U.S. Pat. and Trademark Office and uncovered the following U.S. Pat. Nos.: 4,021,653; 4,354,248; 4,460,806; 4,510,601; 4,604,755; 4,614,909; 4,689,760; 4,782,523; and 4,853,958. All of these patents disclose DTMF detectors, but none discloses a detector which may be configured according to a particular customer's needs and to the operational mode of the system, as in the present invention.

The following six references from Bell Laboratories and the Electronic Industries Association (particularly the first listed) define the DTMF standard:

Bell Communications Research, "Dual-Tone Multifrequency Receiver Generic Requirements for End-to-End Signaling Over Tandem-Switched Voice Links", TR-TSY-000181, Issue 1, Mar., 1987. Bell Communications Research, "Customer Line Signaling", Section 6.2, TR-TSY-000064 LSSGR, Dec., 1984.

Bell System, "Bell System Public Switched Telephone Service Interconnection Criteria For Domestic Public Land Mobile Radio Service, Domestic Public Cellular Telecommunications Service, and Maritime Radio Service", Bell System Technical Reference, No. 326—1987, Dec., 1981.

Bell System Technical Reference, "Description of the Analog Voiceband Interface Between the Bell System Local Exchange Lines and Terminal Equipment", No. 326—125, Jan., 1983.

Engineering Department, "EIA Standard, Telephone Instruments With Loop Signaling For Voiceband Applications", *Electronic Industries Association*. Issue 1, RS-470, Jan., 1981.

Engineering Department, "EIA Standard, Private Branch Exchange (PBX) Switching Equipment For Voiceband Applications", *Electronic Industries Association*, RS-464, Dec., 1979.

The following three references describe a Goertzel processor, which is used as one component 36 in the preferred embodiment of the present invention:

Hartung et al., "Dual-Tone Multifrequency Receiver Using the WE DSP32 Digital Signal Processor", American Telephone & Telegraph Application Note.

Oppenheim et al., *Digital Signal Processing*, Prentice-Hall, Inc., pp. 287—289 (1975).

Mock, "Add DTMF generation and decoding to DSP-uP designs", *Digital Signal Processing Applications with the TMS 320 Family*, Vol. 1, Texas Instruments, pp. 545-557 (1989).

The following two references describe DTMF systems used by companies active in this field:

*Microelectronics Analog Communications Handbook*, Mitel Corporation, pp. 3-27 to 3-33 (1990). This reference discloses a DTMF detector that is not configurable.

Boston Technology Voice Processing Systems, "B. Technical Specification", ACCESS TM SERIES Technical Manual, pp. B-1 to B-18. On page B-8 of this reference is a statement that the minimum detectable tone duration is configurable from 16 msec to 100 msec. There is no suggestion that other characteristics are configurable, or that even this one characteristic is configurable from mode to mode. In the present invention, not just one but 16 characteristics are configurable; and they are independently configurable across four modes of operation, for a total of 64 configurable parameters.

DISCLOSURE OF INVENTION

The present invention is an apparatus and method for detecting DTMF signals in a real-time digital messaging system (10). An input signal (11,12) contains DTMF signals —, audio —, video, data, and/or noise. A determining means (37) determines whether a DTMF signal is present on the input signal (11, 12). The determining means (37) has as inputs the input signal (11,12) and a set of parameters (stored in 38) that describes a plurality of characteristics of the input signal (11, 12). All of the parameters are configurable by the user to minimize the effects of talkoff and to allow non-standard telephone equipment (13,14) to be used in the digital messaging system (10).

BRIEF DESCRIPTION OF THE DRAWINGS

These and other more detailed and specific objects and features of the present invention are more fully disclosed in the following specification, reference being had to the accompanying drawings, in which:

FIG. 3 — is a block system level diagram illustrating the environment in which the present invention operates;

FIG. 4 is a block diagram illustrating the principal functional modules within each digital signal processor 31 of the preferred embodiment of the present invention;

BEST MODE FOR CARRYING OUT THE INVENTION

Figure 1:
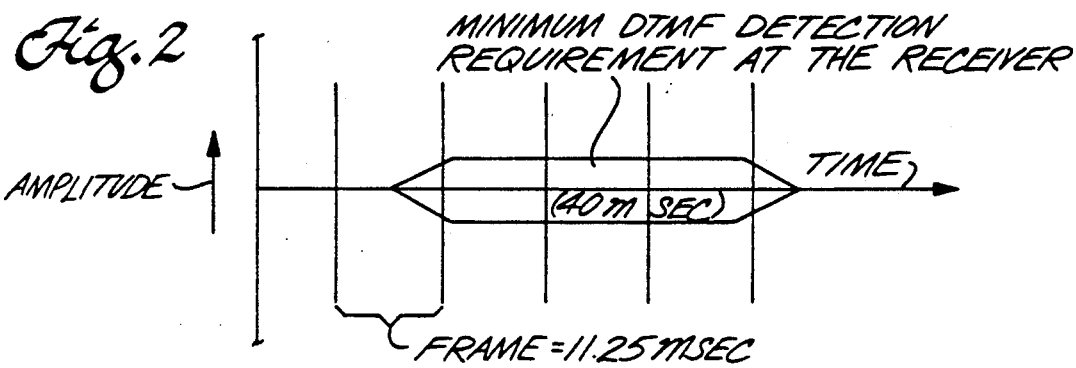
FIG. 1 is a matrix from a conventional DTMF terminal (such as a touchtone keypad of a telephone), showing the pair of DTMF frequencies associated with each key.

The heart of a modern digital messaging system is a computer that is referred to herein as master computer 10. An example of such a device is described in Digital Sound Corporation's brochure entitled "DSC-2000 VoiceServer TM : The Fast Track to Digital Voice Processing", which document is herein incorporated by reference. The primary means of interfacing with master computer 10 is the DTMF (Dual Tone Multi Frequency) signals that are created, e.g., when one presses the keys on a touchtone keypad of a telephone 13, 14. Each DTMF digit comprises two sinusoidal signal components added together. The DTMF keypad is typically arranged as a matrix, four rows by three columns or four rows by four columns, as illustrated in FIG. 1. Each intersection point in the matrix specifies the two frequency components that define a DTMF digit. As described in the above Bell/EIA publications, a number of criteria must be met for the digit to be registered as a valid DTMF digit.

Although the requirements for DTMF detection are well specified, they are not well adhered to in practice. There is a large amount of telephone equipment 13,14 on the market which fails to meet one or more of the specified characteristics. When such equipment 13,14 is connected to a digital messaging center 10, failures often occur. For example, telephone equipment 13,14 that exceeds the twist specification will cause keypresses to be ignored.

Another failure mode is talkoff. Talkoff occurs when the master computer 10 interprets non-DTMF signals, such as voice signals or noise, as a DTMF digit. This can result in inappropriate action being taken by the digital messaging center 10. A determination can be made as to a detector's acceptable limits of talkoff performance by using Bellcore's *DTMF Digit Simulation Test Tape*, which accesses a detector's susceptibility to talkoffs. In the present invention, the parameters can be tailored to minimize talkoff, e.g., "required frames on" can be increased from 3 to 4 (corresponding to an increase from 40 msec to 51 msec).

It is an object of the present invention to create a configurable parameterized DTMF detector that allows the tailoring of DTMF recognition depending upon the particular telephone equipment 13,14 in place. With this configurability, the present invention is able to take corrective action to accommodate non-standard equipment 13,14 at a given site 10 without affecting installations at other sites 10.

It is important to note that there are a number of distinct signal characteristics that are representative of a DTMF digit. These characteristics relate to the absolute magnitude of the two frequencies, deviation of the frequencies from nominal, difference in amplitude between low band and high band peak amplitudes, presence of out-of-band energies, consistency of amplitude from frame to frame, and duration. In the present invention, 16 characteristics are used, each of which can vary across four modes of operation, for a total of 64 configurable parameters. Because of this configurability, the field support technician has the ability to modify the DTMF recognition environment 10.

The 16 characteristics used in the present invention are defined as follows. In each case, the definitions will become more meaningful when considered in light of the tests described later in this specification.

absm — absolute amplitude of a nominal DTMF signal in dBm.

delta — range (tolerance) in dB within which every DFT (discrete Fourier transform) amplitude must remain from frame to frame based upon its initial value in state one.

fdi — frequency deviation index. It can have a value of 0, 1 or 2, representing respectively 2%, 2.5% and 3% deviation between the frequency of the actual amplitude peak and the nominal DTMF amplitude peak.

h2lt — high to low twist in dB, i.e., the difference between the high band amplitude peak and the low band amplitude peak when the high band peak is greater.

l2ht — low to high twist in dB, i.e., the difference between the low band amplitude peak and the high band amplitude peak when the low band peak is greater.

cons — inter-frame consistency in dB. Measures the frame to frame consistency of the normalized DFT amplitudes.

rfon — required frames on. A positive integer representing the number of full frames for which a candidate DTMF signal must be present in order to determine that it is an actual DTMF signal.

rfoff - required frames off. A positive integer representing the required number of frames during which a candidate DTMF signal must not be present in order to make a determination that a DTMF signal is not in fact present.

echo — an absolute value in dBm representing a threshold for echo test 0.

efl0 — echo factor low for echo test 0 in dB. The amplitude of the candidate DTMF signal must equal or exceed another signal by this amount for certain compares in echo test 0.

efh0 — echo factor high for echo test 0 in dB. The amplitude of the candidate DTMF signal must equal or exceed the amplitude of another signal by this amount for certain compares in echo test 0.

efx0 — echo factor x for echo test 0 in dB. The amplitude of the candidate DTMF signal must equal or exceed the amplitude of another signal by this amount for certain compares in echo test 0.

echo1 — an absolute value in dBm representing a threshold for echo test 1.

efl1 — echo factor low for echo test 1 in dB. The amplitude of the candidate DTMF signal must equal or exceed another signal by this amount for certain compares in echo test 1.

efh1 — echo factor high for echo test 1 in dB. The amplitude of the candidate DTMF signal must equal or exceed the amplitude of another signal by this amount for certain compares in echo test 1.

efx1 — echo factor x for echo test 1 in dB. The amplitude of the candidate DTMF signal must equal or exceed the amplitude of another signal by this amount for certain compares in echo test 1.

In the digital messaging system 10 illustrated herein, there are four modes of operation, defined as follows:

1. Default Mode — the mode that is present whenever microprocessor 21 is not recording into or playing from a message file 22. A message file 22 is a digital storage area, e.g., on a hard disk, where a digital message is stored by microprocessor 21. The message file 22 may contain audio, data, video, or any combination thereof.

2. Record Mode — the mode that is present during the recording of information by microprocessor 21 onto a message file 22.

3. Message Mode — the mode that is present during the playing (sending back to a user 13, 14) of an unprocessed message file 22. An unprocessed message file 22 is a message that entered via a telephone line 11, 12 from an external source and will later be destroyed. In the illustrated embodiment, a message file 22 is a type of Unix file within the Univox ™ operating system that has been specifically created by Digital Sound Corporation for real time data flow. Univox ™ is fully compatible with Unix System V Release 3 from American Telephone & Telegraph Co.

4. Prompt Mode — the mode that is present during the playing of a processed message file 22 (prompt), i.e., a predefined message. One is able to pretest prompts 22 for talkoff susceptibility. This is not possible with unprocessed message files 22, and is the primary motivation for distinguishing between message and prompt modes.

A secondary motivation for distinguishing between message and prompt modes is to be able to recognize long distance (close to the −36 dBm level minimum) DTMF digits over prompts on a two-wire circuit 11, 12. Whenever there is a four-to two-wire conversion in telephone analog electronics, a portion of the outbound signal is echoed back onto the input signal. This degrades the qualities of the input signal and may result in a missed digit. Because one is able to test that the prompts 22 will not talkoff, computer 10 can be configured to accept lower quality DTMFs and improve DTMF recognition performance in the prompt mode. Therefore, it is important to be able to configure the DTMF detector 10 based upon its mode of operation.

In the preferred embodiment, a set of standard configurations for each of the 64 parameters has been empirically derived, and is referred to as a DTMF configuration hub, stored in RAM 38 (see FIG. 4). Each hub has a default set of parameters that is expected to meet the needs of the majority of installations 10. Other sets of parameters deal with single point failures that typically occur. For example, it is possible that a PBX (Private Branch Exchange) telephone system will cause all legitimate DTMF signals to fail the twist test (minus 8 dB negative twist plus 4 dB positive twist). The system 10 transfer function so alters the signals that a valid DTMF fails this test. A particular set of twist parameters can then be used for this installation 10 to correct this failure. Another example is a customer with a large number of individual telephones 13,14 that have a tendency to generate talkoff. The major contributor to talkoff is that the Bell/EIA 40 msec duration specification is so short. It is not possible to eliminate all talkoff, but if the prevalence of talkoff is high, g the customer may choose to lengthen the minimum duration needed to validate a DTMF digit, thereby reducing the number of speech simulating DTMFs that occur. The tradeoff is that it takes longer to enter valid DTMF digits.

In tailoring the parameters, the tradeoff is always talkoff. If the parameters are loosened to accommodate non-conforming hardware 13,14, the incidence of talkoff will increase Table 1 hereinbelow gives the set of 64 default parameters for each of the sixteen characteristics in each of the four modes:

TABLE 1

DEFAULT PARAMETERS

| | absm | delta | fdi | h21t | 12ht | cons | rfon | rfoff |
|---|---|---|---|---|---|---|---|---|
| default mode | −36 | 9 | 0 | 6 | 9 | 3 | 3 | 3 |
| record mode | −36 | 9 | 0 | 6 | 9 | 3 | 3 | 3 |
| message mode | −36 | 9 | 0 | 6 | 9 | 3 | 3 | 3 |
| prompt mode | −36 | 9 | 0 | 8 | 11 | 3 | 3 | 3 |

| | echo0 | ef10 | efh0 | efx0 | echo1 | ef11 | efh1 | efx1 |
|---|---|---|---|---|---|---|---|---|
| default mode | −30 | 2.5 | 9 | 12 | −36 | 2.5 | 6 | 6 |
| record mode | −30 | 2.5 | 9 | 16 | −36 | 2.5 | 9 | 10 |
| message mode | −30 | 2.5 | 9 | 12 | −36 | 2.5 | 6 | 6 |
| prompt mode | −36 | 2.5 | 3 | 3 | −36 | 2.5 | 3 | 3 |

The default parameters are fully compliant with the Bell/EIA specifications. Only after specific analysis has been completed at a site 10 will a configuration change be made. If appropriate, the new parameters will not comply with the Bell/EIA specifications if this is needed in order to correct for a particular anomaly in the installation 10.

As can be seen from FIG. 3, computer 10 comprises a system controller 20, line Interface Controller (LIC) 30, and line interface module (LIM) 40. Analog telephone lines 11 connect user telephones 13 to LIM 40. The analog signal passes through low pass filter 41 within LIM 40. Filter 41 acts as an anti-aliasing filter, i.e., it removes high frequencies that are outside the Nyquist window. The filtered signal then passes through analog-to-digital converter 42, which is also present within LIM 40. In the preferred embodiment, an 8000 Hz sampling rate is used within A/D converter 42. This relatively high sampling rate is chosen, even in view of the fact that the highest nominal DTMF frequency is 1633 Hz, because at this point the signal contains other than DTMF signals, e.g., it might contain voice, and because of the Nyquist criterion, which mandates that the digital sampling frequency must be at least twice the analog frequency.

The output of A/D converter 42 is a digital signal having 256 levels (8 bits) traveling on bus 16 to LIC 30. Bu 16 uses techniques of time division multiplexing (TDM) to account for a plurality of telephone users 13, 14 simultaneously. Data entering LIC 30 has to be coded following the CODEC or PCM A-Law or Mu-Law standards.

The present invention can accommodate digital telephone lines 12 as well as analog telephone lines 11. In this case, the telephone users 14 communicate over the digital telephone lines 12 to LIC 30 via T1 LIM (line interface module) 43 and TDM bus 16.

System controller 20 contains a microprocessor 21, which in the preferred embodiments is an Intel 80386 microprocessor running a version of the Unix operating system. System controller 20 is in two-way communications with LIC 30 an dLIM 40 via multibus 15.

LIC 30 also contains an Intel 80386 microprocessor 32 and a set of digital signal processors (DSPs) 31. In a working embodiment, there are eighth DSPs 31, each having the capability of supporting two to three telephone lines 11, 12. Each DSP 31 is preferably a Texas Instruments TMS320C25. A TMS32010 would also be suitable, but with fewer telephone lines 11,12 supported.

Within each digital signal processor 31 is a set of modules (typically RAM modules containing software), illustrated in FIG. 4, which carry out a sequence of events under the control of system controller 20.

Figure 2:
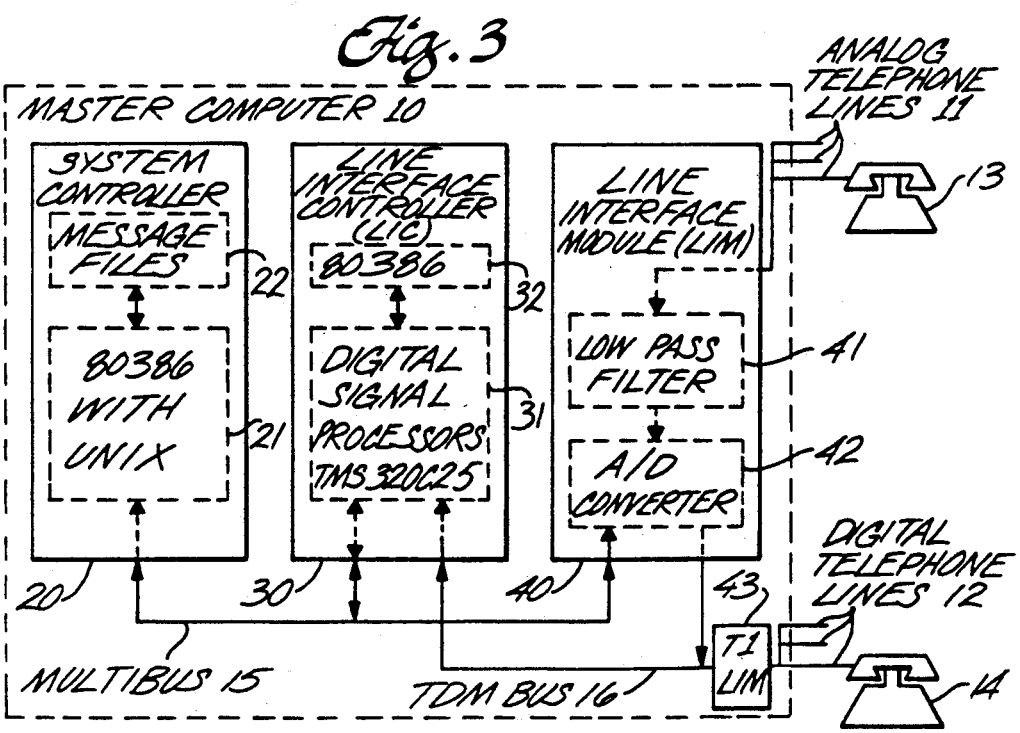
FIG. 2 is a timing sketch showing a digital sampling frame of the preferred embodiment of the present invention superimposed upon a DTMF tone of minimum receive duration.

FIG. 2 illustrates a set of frames superimposed upon a nominal DTMF tone having a duration of 40 msec. A frame is defined as the sampling interval during which a set of Fourier transforms is performed by Goertzel transform module 36. The Bell/EIA standard specifications states that if a candidate DTMF signal is less than 23 msec in duration, one is obliged to reject it; if it is over 40 msec in duration, one is obliged to accept it; and if it is between 23 msec and 40 msec in duration, one can either accept it or reject it. The choices of frame length represents a tradeoff between temporal resolution and frequency resolution. If one lengthened the frame, one would obtain more accurate frequency determination, but the temporal resolution would suffer, as can be seen from FIG. 2; and vice-versa. In the preferred embodiment, the frame has been elected to be 11.25 msec, which corresponds to 90 sampling points within each frame at a sampling rate of 8 KHz. This provides enough resolution to handle the minimum temporal specifications and yet provide adequate frequency resolution to handles frequency deviated DTMFs. Because of the down-sampling introduced by down-sampling module 35, only 45 points are examined by Goertzel transform module 36.

Figure 5A:
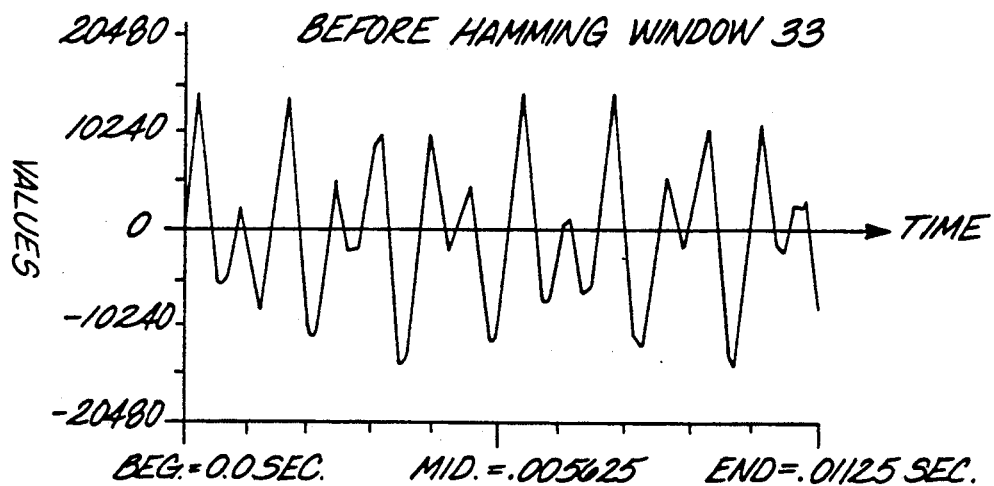
FIGS. 5a–d are analog representations of a DTMF digit 1 as it progresses through various modules within the block diagram of FIG. 4.

Scaling module 32 is needed because DSP 31 uses fixed point arithmetic. The function of scaling module 32 is to maximize arithmetic precision by using the full register length of DSP 31. A large signal is not changed by module 32. A small signal is scaled upwards, and information regarding the amount of the scaling is stored within DSP 31. FIG. 5a is an analog representation of a DTMF digit 1 as it exits module 32. One optimization is potentially used at this time: if the input data scaling factor used by module 32 to scale the input data up before filtering is a maximum, then it is already known that the input data is too weak to be a valid DTMF signal. If this condition is true, remaining calculations and tests are not performed, and low pass filter 34 is reinitialized. Because of this, overflow checking is not performed during filtering to save real-time.

Figure 5B:
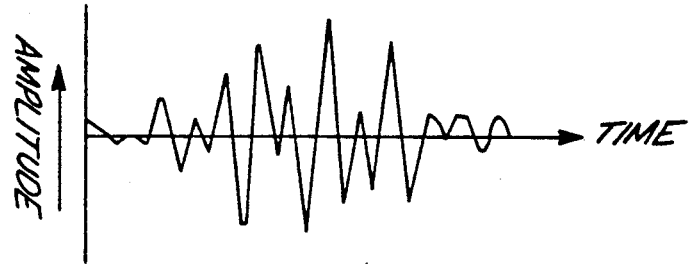

The signal is next processed by Hamming window 33, which converts the signal so that the middle part of the frame is exaggerated. FIG. 5b is an analog representation of the digital signal as it exits window 33. Hamming window 33 is used to minimize the effects of finite analysis, by minimizing the artifacts that are introduced when the signal is transformed from the time domain to the frequency domain by Goertzel transform module 36.

The signal then passes through elliptic low pass filter 34, which acts as an anti-aliasing filter to remove high frequencies that are introduced as the meaning of high frequency is redefined from 8 KHz to 4 KHz. This redefinition occurs because at this point, just candidate DTMF signals and not higher frequency signals such as voice are being processed. The 4 KHz sampling rate allows faster processing than the 8 KHz. The low pass filter specification is tailored to minimize the effects of the filter 34 in the passband, i.e., minimize passband ripple.

Down-sampling module 35 completes the high frequency redefinition process by means of selecting only every other point in the digital data stream and rejecting the rest. Thus, each frame now has 45 data points. Prior to down-sampling, the data can be scaled down to avoid overflow during the Goertzel calculations.

Figure 5C:
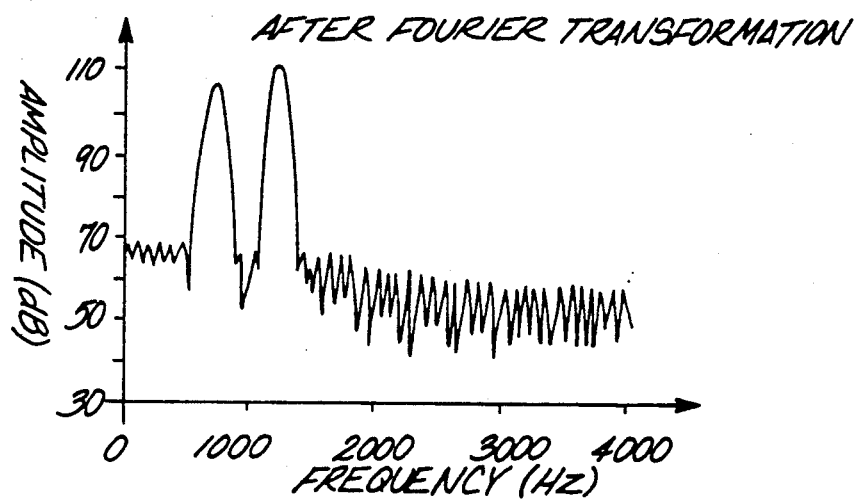
Figure 5D:
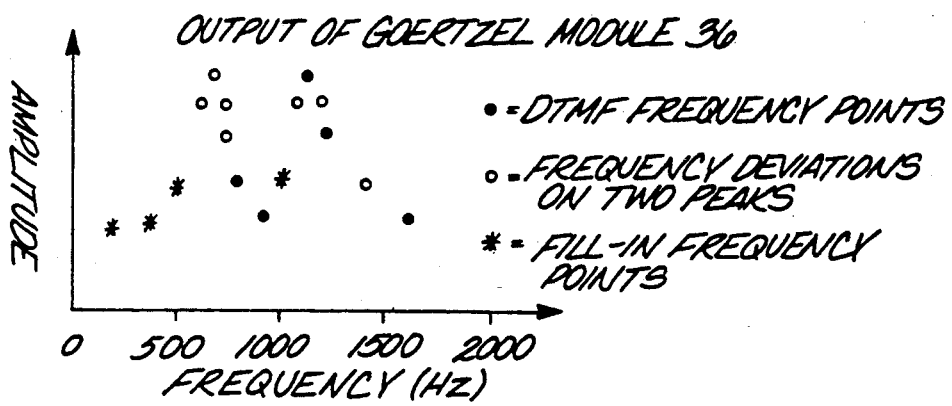

The signal then passes to Goertzel transform module 36. The functioning of Goertzel module 36 is described in references cited in the Background Art section of this specification. The Goertzel transformation is equivalent to performing Fourier transforms at 16 preselected frequency points. For this relatively low number of frequencies, the Goertzel transformation is more accurate than a fast Fourier transformation would be. FIG. 5c is an analog representation of the results of the Fourier transformation portion of module 36; and FIG. 5d illustrates the output of Goertzel module 36: a set of DFT (discrete Fourier transform) amplitudes for sixteen frequencies. The frequencies are the eight nominal DTMF frequencies, plus four frequencies that are just above and just below the two amplitude peaks, plus four other test frequencies. The "amplitude peaks" are those two DFTs having the highest amplitudes, one from the low band (697 Hz to 941 Hz) and one from the high band (1209 Hz to 1633 Hz). These become the candidate DTMF signals. The signal from the low band is known as the low band peak, and the signal from the high band is known as the high band peak. Two indices are also passed by Goertzel module 36, indicating the two candidate DTMF signals and therefore the candidate DTMF digit.

For each frame, the DFT amplitudes at the nominal frequencies for the eight components of the DTMF digits (697 Hz, 770 Hz, 852 Hz, 941 Hz, 1209 Hz, 1336 Hz, 1477 Hz, and 1633 Hz) are computed on the 45 point data array. From these data points, the high band peak and low band peak are determined. Next, the frequency deviated frequencies are computed from the Goertzel coefficient tables.

The next step in the calculations is to compute the test DFT amplitudes. The frequencies for these points (310 Hz, 410 Hz, 510 Hz, and 1075 Hz) were chosen so as to cover as many as possible of the remaining frequency "bins" left in the 2000 Hz band. Additionally, these frequencies were chosen to have little interdependence (harmonic relationships). As will be seen later, these test points will play an important role in the heuristics tests.

Both normalized and unnormalized DFT values are used by heuristics engine 37. Normalized DFT values are used whenever absolute levels, independent of scaling, are needed and when data are to be compared between frames, as the scaling factors may be different. Normalized DFTs account for the scaling that was used in the computations, and correspond to physical voltage levels. These normalized DFT values provide good amplitude resolution with a large logarithmic dynamic range.

Unnormalized DFTs are internal numbers that are used when accuracy is a more important criterion than consistency. Due to scaling and recursive computation, they range between 0 and 400.

The 16 DFT amplitudes (in both normalized and unnormalized form) and two indices are fed to heuristics engine 37, along with the 64 configurable parameters that are stored in RAM 38. Heuristics engine 37 then determines whether the candidate DTMF digit is, in fact, an actual DTMF digit, and if so, which one. This information is fed to system controller 20, which takes appropriate action based upon the DTMF digit.

The heuristics comprise primarily of a set of routines that return a Boolean value for the given test. These Boolean values then drive a state machine. For example, starting with state 0 in the upper right of FIG. 6, if any one of tests a, f, and t are failed, the state remains at 0. If tests a, f, and t are all passed, state 1 is entered. The state machine accounts for most of the temporal heuristics, such as minimum signal duration, by outputting in each state the current state of the output DTMF digit. The state diagram (FIG. 6) transitions at the completion of each analysis frame. Although every heuristic test is performed for every analysis frame, only state specific tests affect the state machine, as is evident in FIG. 6.

If the initial set of 64 parameters produces an unacceptable level of talkoff or otherwise causes malfunctioning of the system 10, some or all of the parameters are then reconfigured by changing the contents of RAM 38, to fit the requirements of the particular equipment 13, 14. This is accomplished by running a Unix shell script out of microprocessor 21.

In the preferred embodiment, DT is the name of the Unix DTMF detection module invoked by microprocessor 21. DT init initializes a DT_Frame structure defined in DT_Var, and initializes low pass filter 34. DT_detect is called to process the input signal and determine whether a valid DTMF digit is present in the input data stream 11,12.

Figure 6:
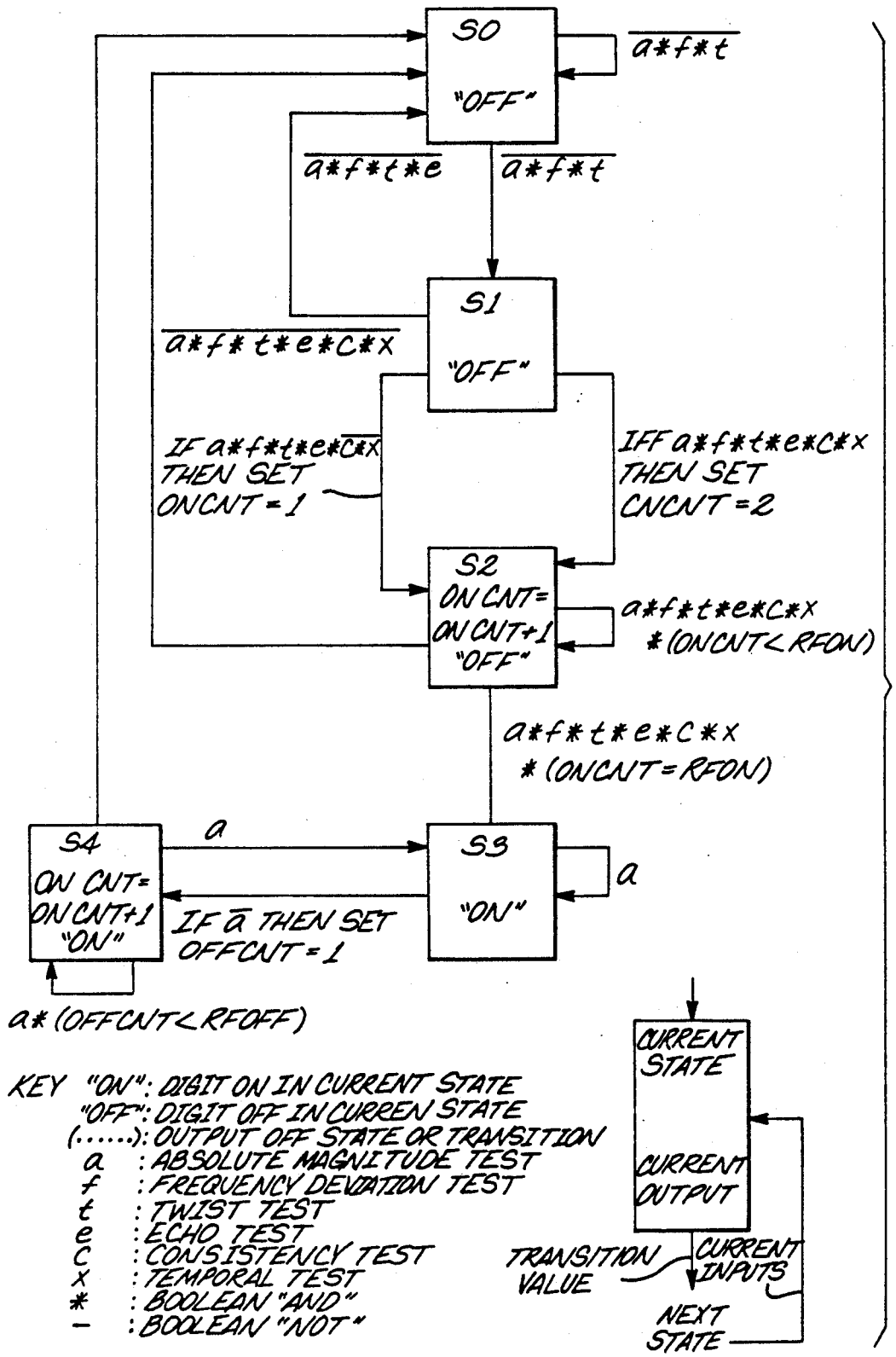
FIG. 6 is a state diagram illustrating the operation of a preferred embodiment of heuristics engine 37.

The tests that are performed by heurisitics engine 37 are defined as follows. All of the tests are performed within the frame of 11.25 msec. Some of the test results are used many times, as shown by FIG. 6.

Absolute Magnitude Test

The absolute magnitude test checks to see that the low band peak amplitude and the high band peak amplitude are above the absolute magnitude threshold, absm. As can be seen from Table 1, the default value of absm in all modes is −36 dBm. Additionally, once into state 1 (s1), only full analysis frames are processed (i.e., the input signal has been activated long enough that the asynchronous character of the input signal 11,12 is no longer a factor: a full set of data points is analyzed for each frame except for the first and last frames). Therefore, in order to pass the absolute magnitude test, every DFT amplitude must remain within a specified tolerance, delta, of the initial value set in state 1. The default value of delta in all modes is 9 dB. The absolute magnitude test uses normalized DFT amplitudes, because DFTs are compared to absolute thresholds as well as compared between frames.

Frequency Deviation Test

The frequency deviation test is performed to verify that the low and high band peak amplitudes are not frequency deviated The Bell/EIA DTMF specifications require that DTMF frequency components must be accepted if the frequencies deviate by 1.5 percent or less, and must be rejected if the frequencies deviate by 3.5 percent or more. This test checks amplitudes at test frequencies that are +/− 4.0, 5.0, or 6.0 percent away from the nominal values. These values correspond to 2.0, 2.5, and 3.0 percent rejection thresholds, respectively, all of which are between the 1.5 and 3.5 percent limits. For example, if the amplitude at the nominal frequency minus 4% is greater than the amplitude at the nominal frequency, it is known that the actual peak has a frequency less than the nominal frequency minus 2%. The choice allows for heuristic parameterization to allow for real world environments. The default value of fdi for all modes is zero, which corresponds to the 2.0 percent rejection threshold. Because this test is concerned only with the current frame (scale values constant) and the comparisons are relative, unnormalized DFT amplitudes are used, to maximize relative precision.

Twist Test

Twist is defined as the difference in amplitude between the low and high band peaks. Normal twist (h2lt) is defined as the amplitude difference when the high band peak amplitude is greater. Reverse twist (l2ht) is defined conversely. The twist values are relative, and only the current frame is considered. Therefore, unnormalized DFT values are used for this test. The Bell/EIA specifications require acceptance of normal twist up to 4.0 dB and reverse twist up to 8.0 dB. As can be seen from Table 1, twist values exceed the specifications' minimum requirements.

Echo Test

The echo test checks for out of band energies in order to minimize talkoff. This test checks the amplitudes of the low and high band peaks relative to the DFT amplitudes at the six other DTMF nominal frequencies as well as at the four test frequencies. Due to analytical limitations given the window size of 11.25 msec, the analysis lobe associated with a given DFT amplitude is very large (the −30 dB point bandwidth is 320 Hz). Therefore, the relative frequency difference between neighboring nominal DTMF frequency components is considered when computing the echo factors (efl0, efh0, efx0, efl1, efh1, efx1). These echo factors are the dB ratio between the low or high band peak amplitude and another DFT amplitude. The echo test is performed only if both the low and high band peak amplitudes are greater than the echo thresholds echo and echol. The test checks the low band nominal frequencies (excluding the low peak) against the low peak. The test then checks the high band nominal frequencies (excluding the high peak) against the high peak. Finally, the low and high peaks are compared with the test frequencies. If any non-peak value exceeds the peak value minus the specific echo factor, the test fails, and the current frame is considered to be "speech-like". Because all comparisons are relative and made within the same analysis frame, unnormalized DFT values are used. Relatively large echo factors are used in modes where one wishes to minimize susceptibility to talkoff (e.g. record mode), whereas relatively small echo factors are used in modes that are considered "talkoff resistant" (e.g. prompt mode).

The echo test is performed in two stages: echo test 0 and echo test 1. The parameters echo0, efl0, efh0 and efx0 are used for echo test 0. The parameters echo1, efl1, efh1, and efx1 are used for echo test 1.

First echo test 0 is performed. The amplitude at the low band peak is compared with echo0. If this amplitude is greater than or equal to echo0, this part of the test is passed and the next part is entered. If the amplitude of the low band peak is less than echo0, the remaining portions of echo test 0 are not performed, i.e. it is equivalent to passing echo test 0. Continuing with echo test 0, the amplitude of the low band peak is compared with the amplitudes at each of the three other low band DTMF frequencies. For the nearest frequency neighbor in either direction, efl0 is used for the compare. For frequencies offset by two frequency bins, efh0 is used for the compare. For frequencies three bins away, efx0 is used for the compare. In each case, the ratio of the amplitude of the candidate DTMF signal to the amplitude of the other signal must be greater than or equal to the corresponding echo factor in order for the test to be passed.

Then the high band peak is compared with the amplitudes at the other high band frequencies. Efl0 is not used for these compares, because there are greater frequency separations within the high band. Rather, efh0 is used for compares with the nearest frequency neighbor in either direction, and efx0 is used for other compares. Again, the ratio of the amplitude of the high band peak to the other DFT amplitude must be greater than or equal to the corresponding echo factor in order for this portion of the test to be passed.

Then compares are performed with the DFT at the test frequency of 1075 Hz. If the low band peak is 941 Hz, and the high band peak is not 1209 Hz, the low band peak amplitude is compared with the amplitude at 1075 Hz using efh0. If the high band peak is 1209 Hz and the low band peak is not 941 Hz, the amplitude of the high band peak is compared with the amplitude at 1075 Hz using efh0. If the low band peak is 941 Hz and the high band peak is 1209 Hz, no compares are performed against the amplitude at 1075 Hz; rather, this portion of the test is automatically passed. Next, compares are performed between the low band peak and each of the three test frequencies other than 1075 Hz using efx0. Finally, three more compares are performed: the high band peak is compared with each of the three test frequencies other than 1075 Hz using efx0.

If all of the above tests are passed, echo test 0 is passed, and echo test — 1 is performed. Echo test — 1 is performed exactly as for echo test 0, except that the parameters are echo1, ef11, efh1, and efx1.

If all of the compares for echo tests 0 and 1 are passed, then the echo test has been passed.

Consistency Test

The consistency test checks to see that the DFT amplitudes from frame to frame are within a specified range, cons. Because comparisons are performed across analysis frames, normalized DFT amplitudes are used. Because the Bell/EIA specifications require that a pulse must be accepted if it has a duration of at least 40 msec and must be rejected if it has a duration of less than 23 msec, cons must be in the range of from 1.1 dB to 5.4 dB. These numbers were derived from worst-case analysis given worst-case frame sampling and assuming partial frame sizes from 8.750 msec for the minimum acceptance case to 5.875 msec for the maximum rejection case. The default value of cons for all modes is 3.0 dB.

Temporal Test

The temporal test checks to see that the low and high band peaks are consistent across frame boundaries. If the peak appears rfon number of times in a row, it is validated. If it is absent rfoff number of times in a row, it is assumed not to exist The above description is included to illustrate the operation of the preferred embodiment and is not meant to limit the scope of the invention. The scope of the invention is to be delimited only by the following claims. From the above discussion, many variations will be apparent to one skilled in the art that would yet be encompassed by the spirit and scope of the invention.

What is claimed is:

1. In a digital messaging system, apparatus for detecting dual-tone multi-frequency (DTMF) signals, said apparatus comprising:
at least one telephone line providing an input signal containing items from a set comprising DTMF signals, audio, video, data, and noise;
digital signal processing means coupled to the telephone line for detecting DTMF signals in the input signal comprising means for determining whether a DTMF signal is present on the input signal, said determining means being coupled to the input signal and being coupled to a set of stored parameters describing a plurality of tone characteristics of the input signal and electrical characteristics of the telephone line for a plurality of modes of operation of the digital messaging system; wherein
all the parameters are configurable to adapt to specific tone and telephone line characteristics.

2. The apparatus of claim 1 wherein the input signal is analog.

3. The apparatus of claim 1 wherein the input signal is digital, said apparatus further comprising:
interposed between the input signal and the determining means, an analog to digital converter.

4. The apparatus of claim 1 wherein there is one parameter for each of a set of characteristics of the input signal and for each of a set of modes of operation of the digital messaging system.

5. The apparatus of claim 4 wherein the characteristics pertain to an absolute magnitude of frequency components appearing on the input signal, a deviation of frequencies compared with nominal stored DTMF tone characteristics, a difference in amplitude between low band and high band frequency peaks, out of band energies, consistency of amplitudes from sampling frame to sampling frame, and consistency of low and high band peaks across frame boundaries.

6. The apparatus of claim 4 wherein the modes of operation are default mode, record mode, message mode, and prompt mode.

7. The apparatus of claim 1 wherein, when said determining means has determined that a DTMF signal is present on the input signal, said determining means further determines which of a set of possible DTMF digits is present.

8. The apparatus of claim 1 wherein:
the determining means comprises a heuristics engine;
the parameters are stored in a random access memory; and
interposed between the input signal and the heuristics engine are the following components, connected in the following sequence: a scaling module, a Hamming window, a low pass filter, a down-sampling module, and a Goertzel transform module.

9. The apparatus of claim 1 wherein the determining means performs the following tests on the input signal from the following set of tests: absolute magnitude test, frequency deviation test, twist test, echo test, consistency test, and temporal test.

10. In a digital messaging system, a computer-implemented process for determining whether a dual-tone multi-frequency (DTMF) digit appears on an input signal, the system comprising:
at least one telephone line providing an input signal;
digital signal processing means coupled to the telephone line for detecting DTMF signals in the input signal comprising means for determining whether a DTMF signal is present on the input signal;
said process comprising the steps of creating a set of stored parameters describing a plurality of tone characteristics of the input signal and electrical characteristics of the telephone line and each of a group of operating modes of the digital messaging system, wherein each of the parameters is configurable to the peculiarities of the system; and
applying a series of tests to the input signal using the set of parameters, to make a determination as to whether the input signal contains a DTMF digit.

11. The process of claim 10 wherein the tests that are performed are from the following set of tests: absolute magnitude test, frequency deviation test, twist test, echo test, consistency test, and temporal test.

12. The process of claim 10 wherein the characteristics that are tested are selected from the group of characteristics comprising absolute magnitude of a signal, change in magnitude of a signal from frame to frame, frequency deviation of a signal compared with a nominal DTMF frequency, high to low test, low to high twist, consistency of signal from sampling frame to sampling frame, number of consecutive frames that a candidate DTMF digit must be present, number of consecutive frames that a candidate DTMF digit must not be not present, and difference in amplitude between a candidate DTMF digit and other items present on the input signal.

13. The process of claim 10 wherein the modes of operation of the digital messaging system are default mode, record mode, message mode, and prompt mode.

14. The process of claim 10 wherein, prior to the applying step, a set of Goertzel transformations in performed on the input signal, said transformations creating a set of amplitude values for eight nominal DTMF frequencies, four frequency deviation frequencies, and four test frequencies.

15. Apparatus for detecting dual-tone multi-frequency (DTMF) signals, comprising:
at least one input line;
digital signal processing means coupled to the input line for detecting DTMF tones on the input line, comprising:
random access memory means containing a plurality of reconfigurable parameters describing a plurality of tone characteristics of the input line and electrical characteristics of the input line for a plurality of modes of operation of the apparatus;
a heuristics engine couple to the input line and to the memory means for determining whether a DTMF signal is present on the input line by comparing a second plurality of characteristics of the input line to the parameters.

16. The apparatus of claim 15, wherein the digital signal processing means further comprises a scaling module, a hamming window module, a low pass filter module, a down-sampling module, and a Goertzel transform module, each of the modules being serially coupled between the input line and the heuristics engine.

17. The apparatus of claim 15, wherein the digital signal processing means comprises means for separating an input signal on the input line into a plurality of serially processed input signal frames, and
wherein the parameters comprise reconfigurable constants representing the absolute magnitude threshold of the signal, the change in magnitude threshold of the signal, the frequency deviation threshold of the signal, the high to low twist threshold of the signal, the low to high twist threshold of the signal, the interframe consistency threshold of signal sampling, the number of consecutive frames, and the difference in amplitude between the signal and out-of-band energy of the signal.

18. The apparatus of claim 15, wherein the heuristics engine further comprises means responsive to detection of a DTMF signal for determining whether the DTMF tone matches one of a plurality of DTMF digits.

19. The apparatus of claim 15, wherein the heuristics engine further comprises means for performing a plurality of tests on the input signal, the tests comprising an absolute magnitude test, frequency deviation test, twist test, echo test, consistency test, and temporal test.

* * * * *